May 5, 1964

H. L. DOBRIKIN ETAL 3,131,609

PARKING BRAKE CONTROL CHAMBER

Filed Nov. 30, 1960

INVENTORS.
HAROLD L. DOBRIKIN
VICTOR MASTIS
BY Parker & Carter
Attorneys.

May 5, 1964  H. L. DOBRIKIN ETAL  3,131,609
PARKING BRAKE CONTROL CHAMBER
Filed Nov. 30, 1960  2 Sheets-Sheet 2
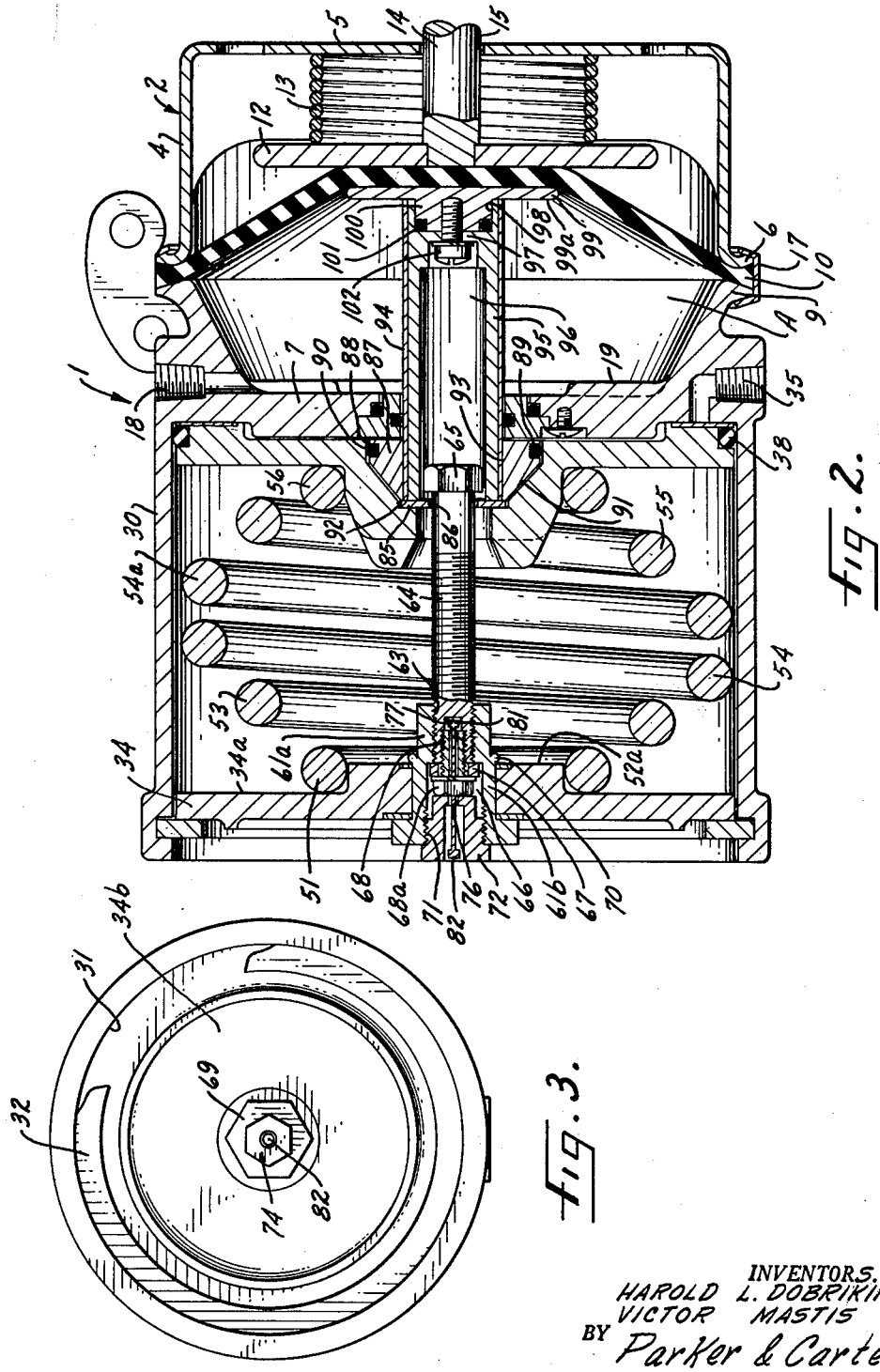
INVENTORS.
HAROLD L. DOBRIKIN
VICTOR MASTIS
BY Parker & Carter
Attorneys.

United States Patent Office 3,131,609
Patented May 5, 1964

3,131,609
PARKING BRAKE CONTROL CHAMBER
Harold L. Dobrikin, Highland Park, and Victor Mastis, Chicago, Ill., assignors to Berg Airlectro Products Co., Chicago, Ill., a corporation of Illinois
Filed Nov. 30, 1960, Ser. No. 72,660
8 Claims. (Cl. 92—63)

This invention relates to control mechanisms and has particular relation to a structure effective to apply the brakes of a vehicle automatically upon diminution or loss of normal brake operation pressure, and also to serve as an application means for the parking brake of such a vehicle.

One purpose of the invention is to provide a unitary structure incorporating a normal brake operating chamber and a combination emergency and parking brake operating chamber.

Another purpose is to provide a brake application means employing a spring of particular configuration effective to supply maximum force over a predetermined distance while occupying a minimum special area.

Another purpose is to provide a brake application means incorporating a spring of uniform, minimum rate and maximum directional stability.

Another purpose is to provide a brake application means.

Another purpose is to provide a brake application means having a coil compression member and abutment means for precluding complete compression thereof.

Another purpose is to provide a brake application means having a piston and means for limiting the movement thereof.

Another purpose is to provide a brake application means having a piston carrying a socket and means occupying said socket for transmitting the motion of said piston outwardly of the housing in which said piston is operable.

Another purpose is to provide a brake application means having a flexible diaphragm and a seat for said diaphragm comprising fixed and movable portions.

Another purpose is to provide adjustable means for limiting the travel of said piston.

Another purpose is to provide means productive of maximum safety in dismantling the invention.

Another purpose is to provide a cylinder having a removable end wall, a piston and a spring therebetween and means for clamping said elements together for unitary removal from said cylinder.

Other purposes will appear from time to time during the course of the specification and claims.

We illustrate our invention more or less diagrammatically in the accompanying drawings, wherein:

FIGURE 2 is a view similar to that of FIGURE 1 and illustrating the parts in another position; and FIGURE 3 is an end view of the brake housing shown in FIGURES 1 and 2.

Figure 1:
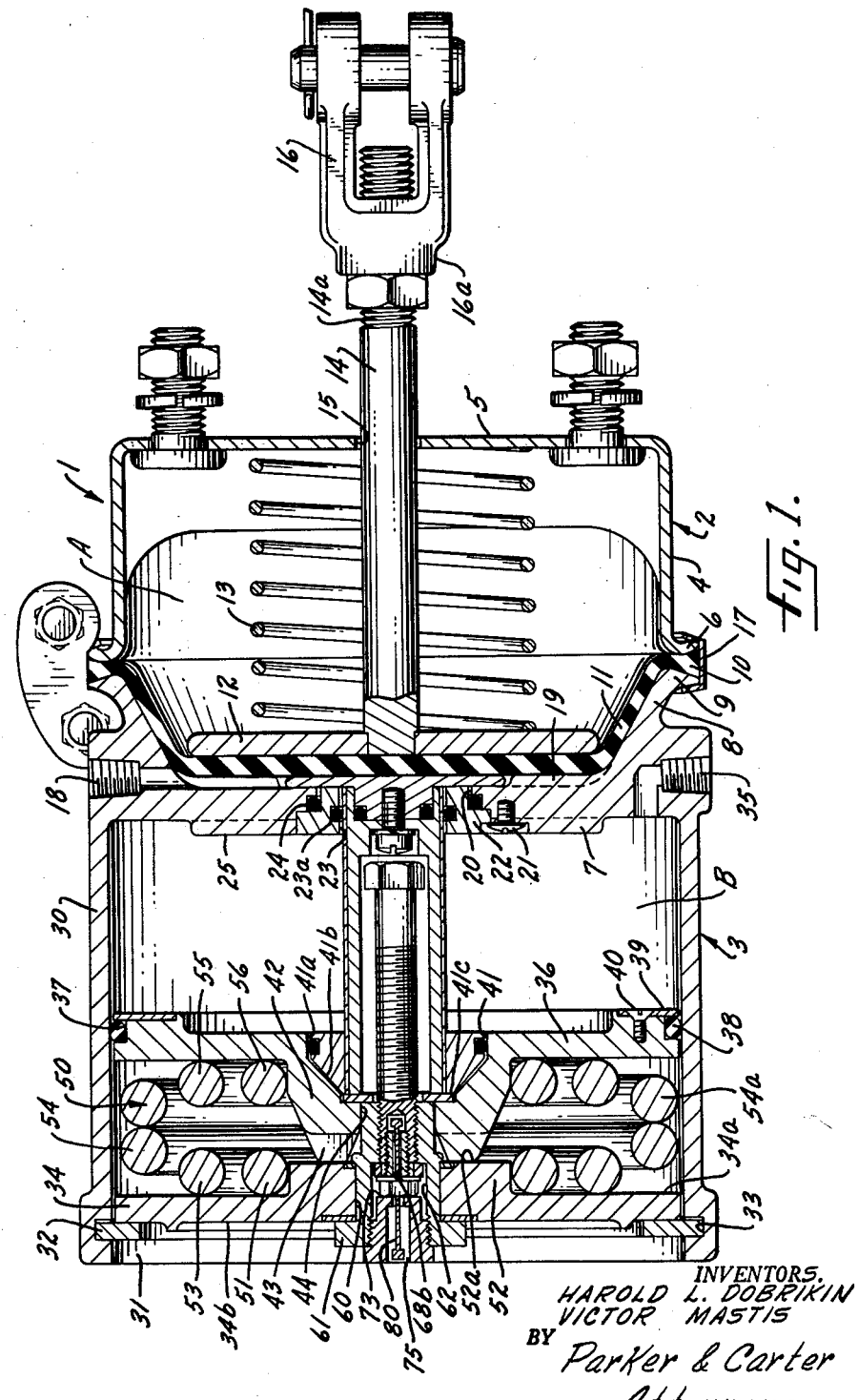
FIGURE 1 is a side view, in partial cross section, illustrating the parts in one position.

Referring now to the drawings, and particularly to FIGURE 1, a brake chamber, of substantially recognized construction, is indicated generally at 1. The chamber 1 is formed of two halves, the same being indicated generally at 2, 3. The portion 2 has a circumferential wall 4 bounding an end wall 5. The circumferential wall 4 carries an annular flange 6. The chamber portion 3 similarly has a wall 7 with a conical portion 8 extending therefrom and carrying an annular flange 9. The flanges 6, 9 clamp therebetween the periphery 10 of a flexible diaphragm 11 substantially dividing the area A within chamber 1.

A pad 12 of generally circular configuration has a flat surface held against a major portion of one surface of the diaphragm 11 by a yielding means 13 operative against the opposite surface of the pad 12 and against the inner surface of chamber wall 5. The pad 12 is secured to an operating rod 14 extending through an aperture 15 in chamber wall 5 and secured at its threaded end 14a to a clevis 16 having an internally threaded end 16a. It will be understood that the element 16 is in turn secured to a brake operating arm (not shown) of the brake mechanism of a vehicle. The threaded connection between rod 14 and clevis 16 provides simple means for adjusting for brake wear when operating rod travel becomes insufficient to completely apply the brakes.

A clamp ring 17 joins the flanges 6 and 9 on opposite sides of the diaphragm periphery 10.

The flange 8 has formed therein a pressure inlet 18 positioned to deliver fluid pressure to that side of the diaphragm 11 opposite from the side in contact with the pad 12. The rear wall 7 of the brake chamber 2 has an inwardly directed annular abutment surface 19 positioned for contact by that surface of diaphragm 11 opposite to the diaphragm surface contacted by pad 12 when the parts are indicated in the position illustrated in FIGURE 1. A central aperture 20 is formed in wall 7. Held in the aperture 20, as by securing means 21, is a fitting 22 having a bore 23 coaxial with that of the aperture 20. Seal means 24 seals the fitting 22 in aperture 20. An annular abutment 25 extends from the opposite surface of wall 7 from that surface carrying abutment 19 and surrounds the perimeter of fitting 22.

A cylindrical wall 30 is formed integrally with the wall 7 and has an open opposite end indicated at 31, the wall 30 having a diameter substantially equal to that of chamber 1 and extending from wall 7 coaxially with chamber 1. A snap ring 32 seats within a groove 33 formed in the inner surface of wall 30 adjacent the open end 31 and a removable rear wall plate 34 seats against the inner surface of ring 32 to form with the cylindrical wall 30 and the wall 7 a chamber indicated generally at B. A fluid pressure inlet 35 is formed in the flange 8 and wall 7 for communication with chamber B adjacent the wall 7.

A piston 36 is mounted for reciprocation within chamber B. The cylindrical surface of piston 36 is recessed as at 37 to receive a seal 38 operative against the inner surface of wall 30 and an annular plate 39 is secured to the piston 36 as by means 40, the plate 39 having an outer perimeter portion overlying and retaining the seal 38 in the recess 37.

The piston 36 has a central or axial well or socket 41 defined by a central extension 42 which extends toward the plate 34. The socket 41 has a circular portion 41a coextensive with the thickness of piston 36 and an inwardly conical portion 41b communicating therewith, the portion 41b communicating at its opposite end with a circular bottom socket portion 41c. The extension 42 terminates in a plurality of annularly spaced terminal feet portions illustrated at 43. A bore 44 is formed in the extension 42 and communicates with the socket 41 coaxially therewith.

Operative against the inner face 34a of plate 34 and against the opposed face of piston 36 is a force-creating yielding means 50. The means 50 comprises a spring formed of a single strand coiled in what may, for convenience, be described as a "barrel-shaped" design. The one end coil 51 of spring 50 is positioned by an inwardly extending circular boss 52 formed on plate surface 34a at the center thereof. The next coil 53 of spring 50 is of a diameter greater than that of coil 51 and an intermediate coil 54 is of a diameter greater than that of coil 52. The next adjacent coil 54a is of a diameter substantially equal to that of coil 54. The next coil 55 has a diameter substantially equal to coil 53 and the opposite end coil 56 is of a diameter substantially equal to that of coil 51. The coil 56 is positioned about and by the piston extension 42.

The extension 52 adjacent piston 36 has a diameter substantially equal to that of abutment 52 and is coaxial therewith. The feet 43 abut the inner face 52a of abutment 52 when the piston is in its rearmost position as illustrated in FIGURE 1.

A central bore 60 is centrally positioned in plate 34 and extends through abutment 52. Rotatably positioned in the bore 60 is a collar fitting 61 itself having an axial bore 62, the inner end portion 61a of which is inwardly threaded as indicated at 63. The portion 61a extends inwardly beyond abutment surface 52a and into bore 44 when the piston 36 is in the position illustrated in FIGURE 1. An elongated bolt 64 is threaded into fitting 61 as at 63 and extends inwardly through chamber B to a point adjacent the wall 7 and terminates in an enlargement or head 65 to serve, as will appear hereinbelow, as a stop abutment or clamp means limiting movement of the piston 36.

The fitting 61 has a well 66 formed in the remaining portion 61b thereof, the inner wall surface of well 66 being circular in cross section. A circular washer element 67 overlies the end of bolt 64 opposite that to which the head 65 is affixed, the washer 67 being slidable in well 66 in response to rotation of fitting 61 and its threaded engagement with bolt 64. A bolt 68 threadably engages bolt 64 and carries a bolthead 68a serving to retain washer 67 tightly against bolt 64. The washer 67 then serves as a threading limit stop for the bolt 64.

The fitting 61 has an outer enlargement or head surface 69 rotatably positioned adjacent and abutting the outer surface 34b of plate 34 and being formed for engagement by a suitable tool. The head 69, in cooperation with the peened or outwardly deflected segment 70 engaging surface 52a retains fitting 61 rotatably in the bore 60.

The well 66 has its outwardly open end inwardly threaded as indicated at 71 for threadably engaging and receiving a retainer fitting 72, the fitting 72 having an inner circumferential end segment 73 positioned for engaging the outer end surface of bolt head 68a when the fitting 72 is fully inserted in the well 66 of fitting 61. The fitting 72 has an outer head portion 74 formed for reception of a suitable tool and arranged to abut the outer face of fitting head portion 69.

The fitting 72 itself has a well 75 communicating at one end with the outer end surface of head 74 and at its other end with an aperture or bore 76 extending through the end wall of inner lock fitting segment 73. The bolt 68 has a bore 68b extending therethrough and in axial alignment with bore 76 and well 75 as well as with the inwardly threaded well 77 formed in bolt 64 for reception of bolt 68.

An elongated wire element 80 extends from a point adjacent the outer open end of well 75, through bore 76, and bore 68b, to a point beneath bolt 68 in bore 77 of bolt 64. The opposite ends of wire 80 are enlarged by flattening or crimping, as indicated at 81, 82.

Seated in the bottom circular socket portion 41c is a ring or annulus 85 having an outer diameter substantially equal to the diameter of socket portion 41c and having an axial bore 86 through which bolt 64 extends and which has a diameter only slightly greater than the diameter of bolt 64.

Seated in socket 41 is a head element 87 having a circumferential portion 88, the outer diameter of which is only slightly less than the socket portion 41a and which carries in a recess 89 a seal 90 for engagement with the wall of socket portion 41a. The head 87 has a conical portion 91 the outer surface of which is only slightly less in diameter than socket portion 41b and the inclination of which is identical to that of socket portion 41b. When the head 87 is seated in socket 41, its inner annular end surface 92 abuts an opposed annular surface of ring 85.

An axially extending bore 93 in head 87 receives, as by press fit, a thin, hollow, tubular sleeve 94 which in turn receives, as by press fit, a longitudinally extending tubular element 95. The member 95 has a longitudinally extending well or socket 96, the diameter of which is greater than that of bore 86 in ring 85. It will be observed that the bore 86 of ring 85 is of less diameter than the head 65 and that the well 96 is of sufficient depth to receive the entirety of bolt 64 and head 65 extending inwardly into the cylinder formed by wall 30 from fitting 61 when the parts are in the position illustrated in FIGURE 1.

The member 95 has adjacent its end opposite from that received in head 87, and beyond head 65 from head 87, a web 97 forming a bottom wall for an end socket 98 formed in member 95. A pad member 99 has its outer face positioned for engagement with the opposite surface of diaphragm 11 from that engaging pad 12, the outer diameter of pad 99 being only slightly less than the inner diameter described by annular abutment 19 and being of identical thickness with the abutment 19. Pad 99 has an axial rearward extension 100 seated in socket 98 of member 95 and carrying a seal 101 in engagement with the inner wall of socket 98. Suitable attaching means, such as the bolt 102, retains the pad 99 on member 95, the pad 99 being positioned in chamber A at all times and having a rear annular surface 99a positioned to engage the wall 7 about aperture 20 within chamber A. It will be observed that the outer surface of sleeve 94 engages the seal 23a in plug 22 seated in aperture 20 of the wall 7.

The use and operation of the invention are as follows:

Under normal condition, pressure is maintained in chamber B between piston 36 and wall 7 thereof, said pressure entering through inlet 35. The pressure in chamber B holds piston 36 in retracted position and holds springs 50 in compressed configuration. The spring 13 holds pad 12 against diaphragm 11 and holds diaphragm 11 normally in the position illustrated in FIGURE 1, or against the abutment 19 and pad 99. When the operator of the vehicle desires to apply the brakes, pressure is directed through inlet 18 into chamber A between diaphragm 11 and wall 7, said pressure forcing diaphragm 11 toward end wall 5 and thus causing pad 12 and rod 14 to move toward brake-applying position against the action of spring 13 to apply the brakes. In this normal brake-applying operation the pad 99, tube 95, piston 36 and spring 50 are not affected and remain in the position illustrated in FIGURE 1, for example.

With the parts as illustrated in FIGURE 1, the annular abutment 19 and pad 99 of equal thickness therewith, together provide a seat for diaphragm 11, the seat approximating the diameter of the pad 12 operative against the opposite surface of diaphragm 11.

In the event of loss or diminution of the pressure in chamber B below a predetermined point, the spring 50 is effective to move the piston 36 and, with it, tube 95 toward the wall 7 and thus to move pad 99, diaphragm 11, pad 12 and rod 14 toward brake-applying position. Thus, upon such loss or diminution of pressure from chamber B, an automatic application of the brakes of a vehicle is effected.

It will be understood that the spring 50 must be of sufficient strength to fully apply the vehicle brakes employed, for example, on a heavily loaded trailer-truck combination. The spring 50, however, must be such as will occupy a minimum spacial area to provide for suitable installation in the limited space available on the vehicle and to provide for its association with the chamber. It will be further understood that the length of stroke required for adequate application of the brakes may vary. Such variance may be due to installation peculiarities or to the gradual wearing of the brakes of the vehicle. Thus, the spring 50 must be further capable of supplying sufficient brake-applying force over a stroke varying, for example, from ¼ inch to 2½ inches. The spring illustrated herein, for example, has been found to provide forces approximately 2,000 pounds at near-zero stroke to forces approximating 1,000 to 1,200 pounds at strokes of 2½ inches.

It will be observed that spring 50 may be considered as "barrel-shaped" in over-all configuration, the opposite end coils 51, 56 of spring 50 being of one diameter, the inwardly adjacent coils 53, 55 being of a somewhat larger diameter, and the two intermediate coils 54, 54a being of a diameter larger than that of the coils 53, 55. The said configuration is effective to supply the required forces through the medium of a single spring.

The feet 43 of central piston extension 42 are positioned to abut the element 52 prior to complete compression of the spring 50, as illustrated in FIGURE 1.

When it is desired to remove elements from the chamber B, for example, to replace the seals 37, the operator simply removes the fitting 72 by rotating it outwardly from fitting 61. Thereafter, the head 69 may be grasped by a suitable tool and through it the fitting 61 is rotated in place in bore 60. In response to the threaded engagement of fitting 61 with the bolt 64, such rotation produces a rearward excursion of bolt 64 until the head 65 is brought into engagement with the ring 85 and thus into clamping relationship with the piston 36. Should the spring 50 be extended at the time, in brake-applying direction, such that the piston 36 is forced into the position shown in FIGURE 2, head 65 will engage ring 85 immediately upon beginning rearward excursion and will clamp the piston in this relationship. Thus, the plate 34 and piston 36 may be clamped together against the bias of the spring 50 compressed therebetween. The snap ring 32 may then be removed and the entire assembly thus described may be easily and simply removed in clamped condition from chamber B. The wire 80 retains lock fitting 72 in association with the parts thus described.

With the plate 34, spring 50 and piston 36 removed, the tubular member 95 and head 87 remains in place, as illustrated in FIGURE 1. Replacement is easily and simply accomplished. The piston 36 and plate 34, with the spring 50 compressed therebetween, is reinserted in chamber B, the conical surface of head portion 91 serving as a lead-in or guide for the circumferential section 41a of socket 41 of piston 36. When the head 87 has been fully received in socket 41, the fitting 61 is then rotated to move the bolt 64 into the position illustrated, for example, in FIGURE 1 with washer 67 seated in the bottom of well 66. The lock fitting 72 is then threadably inserted in well 66, the end surface 73 thereof being brought into engagement with bolt head 68a to lock the bolt 64 and fitting 61 against relative rotation.

Whereas we have described and claimed a practical and operative device, nevertheless many changes may be made in size, shape, number and disposition of parts. We therefore wish our description and drawings to be taken as in a broad sense illustrative or diagrammatic, rather than as limiting us to our precise showing.

We claim:

1. A brake actuating mechanism comprising a chamber having an inner wall and an outer wall, a piston in said chamber, a fluid pressure inlet in said chamber between said piston and said inner wall, brake actuating means operatively connected to said piston and extending through said inner wall, a coil spring between said outer wall and said piston tending to bias said piston towards said inner wall in brake-applying direction, piston-retracting means rotatably mounted in said outer wall and adapted to engage said piston to retract said piston into spring-compressing relationship with said outer wall, said piston-retracting means including a collar fitting rotatably mounted in said end wall and having an internally threaded bore and an externally threaded bolt threaded into said internally threaded bore and adapted to engage said piston upon rotation of said collar and locking means engaging said collar and said bolt and formed and adapted to prevent relative rotation therebetween.

2. The brake actuating mechanism of claim 1 wherein said locking means removably engages said collar and bolt and further characterized by and including an element loosely connecting said locking means, said collar and said bolt, to prevent complete separation thereof when said locking means is removed from said collar.

3. A brake actuating mechanism comprising a chamber having an inner and an outer wall, a piston in said chamber having an inner face and an outer face, a fluid pressure inlet in said chamber between said inner face and said inner wall, a socket in the center of said inner face of said piston, a tubular member releasably seated in said socket and extending through said inner wall, said tubular member adapted to operatively engage a brake actuating means, an extension on the outer face of said piston, said extension being positioned to seat upon an inner surface of said outer wall when said piston is in fully retracted position, a spring between said outer wall of said chamber and said outer face of said piston tending to bias said piston towards said inner wall, a piston-retracting means connected to said outer wall and adapted to engage said piston, said piston-retracting means including a collar rotatable in said outer wall and having a set of internal threads, a bolt extending into said collar having external threads threaded into said internal threads, said bolt having a head end, said collar adapted to turn in said outer wall and draw said bolt through said threads to bring said head into engagement with said piston to hold said piston against the bias of said spring.

4. The brake actuating mechanism of claim 3 further characterized by and including a second set of internal threads in said collar, a locking means having external threads adapted to seat in said second set of internal threads and bear against said bolt to lock said bolt in unretracted relationship.

5. A brake actuating mechanism comprising a brake chamber, a diaphragm dividing said brake chamber, a brake actuating rod engaging said diaphragm and extending outwardly of said chamber, a second chamber secured to said first chamber, a piston reciprocable in said second chamber, a fluid pressure inlet in said second chamber between said piston and said first chamber, a central socket in said piston, a tubular member having an open end removably received in said socket and extending therefrom into said first chamber, means carried by said tubular member in said first chamber in position to engage said diaphragm on the opposite side thereof from said actuating rod, and yielding means having its opposite ends in engagement with said piston and an end wall of said chamber and positioned to urge said piston towards said inlet, piston retracting means engaging said end wall and having a head portion extending into said tubular open end to engage said piston, said retracting means head portion being retractable through said tubular member to clamp said piston to said end wall, compressing said spring therebetween, said head portion being removable through said tubular open end when said piston, spring and end wall are unitarily removed from said chamber.

6. The brake actuating mechanism of claim 5 further characterized by and including a common wall separating said first and second chambers, said tubular member extending through said common wall, said common wall having a recess therein within said first chamber, said diaphragm-engaging means carried by said tubular member being seated in said recess and flush with the surface of said common wall surrounding said diaphragm-engaging means when said yielding means is in a compressed state.

7. Motor means comprising a cylinder, a piston reciprocal in said cylinder, an end plate removably secured adjacent one end of said cylinder, a spring operatively engaging said end plate and said piston, and means for retracting said piston against the action of said spring, said means including a collar rotatably mounted in said end wall, said collar having an internally threaded bore therein, a bolt threadably engaging said bore and extending through said piston, said bolt having a head at its end opposite the portion engaging said bore, a counterbore in said collar, a bore in the end of said bolt within said collar, locking means threadably engaging said counterbore in said collar and said bore in said bolt end to lock said bolt against rotation in response to rotation of said collar.

8. The structure of claim 7 characterized by and including a tie member extending through said locking means within said collar counterbore and said bolt-end bore.

References Cited in the file of this patent

UNITED STATES PATENTS

| | | |
|---|---|---|
| 2,754,805 | Beman | July 17, 1956 |
| 2,848,980 | Ayers | Aug. 26, 1958 |
| 2,933,160 | Van Wart et al. | Apr. 19, 1960 |
| 2,976,085 | Grogan | Mar. 21, 1961 |
| 2,992,630 | Leighton et al. | July 18, 1961 |
| 3,020,094 | Murty et al. | Feb. 6, 1962 |

FOREIGN PATENTS

| | | |
|---|---|---|
| 563,954 | Belgium | Jan. 31, 1958 |